(12) United States Patent
Elrod

(10) Patent No.: US 7,972,097 B2
(45) Date of Patent: Jul. 5, 2011

(54) RIGID TAPPING FEEDBACK ASSEMBLY FOR A MILLING MACHINE

(75) Inventor: Dwayne S. Elrod, Flagstaff, AZ (US)

(73) Assignees: Dwayne S. Elrod, Flagstaff, AZ (US); Elizabeth A. Domokos-Elrod, Flagstaff, AZ (US)

( * ) Notice: Subject to any disclaimer, the term of this patent is extended or adjusted under 35 U.S.C. 154(b) by 1026 days.

(21) Appl. No.: 11/777,109

(22) Filed: Jul. 12, 2007

(65) Prior Publication Data
US 2009/0016833 A1 Jan. 15, 2009

(51) Int. Cl.
*B23C 1/06* (2006.01)
*B23Q 15/013* (2006.01)
*B23B 47/18* (2006.01)

(52) U.S. Cl. .......... 409/231; 409/187; 408/10; 408/11; 408/128; 29/401.1

(58) Field of Classification Search .............. 408/10, 408/11, 128; 409/131, 132, 144, 186, 187, 409/193, 194, 204, 207, 208, 210, 214, 218, 409/228, 229, 230, 231–232; 29/401.1, 407.01, 29/407.05
See application file for complete search history.

(56) References Cited

U.S. PATENT DOCUMENTS

| | | | | |
|---|---|---|---|---|
| 3,467,177 A | * | 9/1969 | Hoddinott | 165/47 |
| 3,621,727 A | * | 11/1971 | Cicognani | 474/205 |
| 5,062,744 A | * | 11/1991 | Nakamura et al. | 408/8 |
| 5,857,814 A | * | 1/1999 | Jang | 408/6 |

* cited by examiner

*Primary Examiner* — Erica E Cadugan
*Assistant Examiner* — Matthew Beisel
(74) *Attorney, Agent, or Firm* — Shook, Hardy & Bacon LLP

(57) ABSTRACT

This invention is related to a rigid tapping feedback assembly that is adapted to being retrofit on a milling machine having a spindle with a spindle end extending beyond a bearing cap and an automated drive. In embodiments, the assembly comprising a housing, spindle-pulley adapter that is drivably engaged with the spindle end, pulley assembly, shaft assembly, housing cover plate, and rotary encoder. The housing mounts to the bearing cap and holds the shaft assembly in substantially parallel-spaced alignment with the spindle-pulley adapter. The pulley assembly mechanically links the spindle-pulley adapter and the shaft assembly, typically utilizing pulleys and a timing belt. The housing cover plate mounts to the housing enclosing the assembly components above and supporting the rotary encoder in substantial axial alignment with the shaft assembly. In operation, the rotary encoder senses spindle rotational speed spindle and provides feedback to the automated drive to control downward movement of the spindle.

14 Claims, 4 Drawing Sheets

RIGID TAPPING FEEDBACK ASSEMBLY FOR A MILLING MACHINE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to milling machines, and more particularly to a rigid tapping feedback assembly that is adapted for retrofitted use on conventional milling machine to determine a rate of revolution of a spindle.

Milling machines, such as a knee mill, turret mill, or vertical mill, are common in the fabrication industry. Typically, milling machines include a spindle, an endmill or cutter tool that is attached to, and rotates concurrently with, the spindle. The spindle can be extended along the generally vertically orientated spindle axis, e.g., Z-axis, allowing for plunge cuts and drilling of a work piece. The work piece is affixed to a table that is located below the endmill and is typically moveable in the X-axis and Y-axis.

During operation, the spindle may be manually lowered along the Z-axis (e.g., generally vertically), or automatically adjusted by a computer numerical control (CNC) controller. The CNC controller sends a signal to an automated drive (e.g., carried out by a stepper or servo motors) that extends the spindle according to a predetermined feed rate. For particular automated drives, feedback of the position of the spindle is transmitted to the CNC controller such that the position of the spindle, or quill, can be continuously monitored. Accordingly, the depth of the cut in the z-direction is held constant and the cutting operation is repeatable between a plurality of work pieces.

Typically, the predetermined feed rate is established based upon the pitch of the tap to be machined and the rotational speed of the spindle as set on the milling machine motor. But, if the spindle rotates at a speed other than the set rotational speed, the predetermined feed rate of the spindle will be unaffected and cause the CNC controller to drive the spindle downward causing undue stress on the tool. As such, the present invention pertains to a rigid tapping feedback assembly that may be retrofitted onto a conventional milling machine. Significantly, the design of the rigid tapping feedback assembly provides additional input to the CNC controller that controls the operation of the automated drive.

BRIEF SUMMARY OF THE INVENTION

Accordingly, the present invention provides a rigid tapping feedback assembly that is adapted to being retrofit on a conventional milling machine. The conventional milling machine (e.g., vertical mill, Bridgeport Machine, etc.) includes a spindle with one spindle end rotatably engaged with a spindle-pulley adapter and a tool with a tapping pitch attached at the opposed end of the spindle. In addition, the conventional milling machine includes an automated drive that turns the spindle at a rate of revolution. In embodiments, the rigid tapping feedback assembly comprises a housing, a spindle-pulley adapter that is drivably engaged with the spindle end, a pulley assembly, a shaft assembly, a housing cover plate, and a rotary encoder. The housing is adapted to being mounted to the conventional milling machine, typically utilizing preexisting lift holes (e.g., for dissembling a drawbar), previously drilled and tapped into the cover plate. The housing may hold the shaft assembly in substantially parallel-spaced alignment with the spindle-pulley adapter that is drivably engaged to the spindle end. The spindle-pulley adapter mechanically links the spindle and the pulley assembly. In one embodiment, the pulley assembly utilizes pulleys, each circumferentially engaged in substantial axial alignment to the shaft assembly and spindle-pulley adapter, and a timing belt having teeth that provide a positive mechanical link between pulleys. The housing cover plate mounts to the housing thereby providing a substantial protective enclosure for the pulley assembly. In addition, the housing cover plate supports the rotary encoder in substantial axial alignment with the shaft assembly. Optionally, the housing cover plate supports a drawbar in substantial axial alignment with the spline adapter and is engaged thereto.

In operation, the rotary encoder senses the rate of revolution of the spindle and provides feedback to assist in controlling the feed rate (e.g., to control z-axis movement of the spindle). Initially, the automated drive (e.g., automated quill drive motor) extends the spindle at a predetermined feed rate set according to the initial speed of rotation of the spindle and the tapping pitch of the tool. During cutting, the initial speed of rotation of the spindle may be affected by resistance while machining. In response, the rotary encoder is configured to provide a computing device (e.g., CNC controller) with feedback indicating the actual rate of revolution of the spindle. The input actual rate of revolution may rectify any deviations from the initial rotation speed set at the milling machine motor. As such, the computing device will process the input from the rotary encoder and adjust the feed rate of the spindle in accordance therewith. This may result in varying the feed rate so that it corresponds with the unpredicted variations in the spindle rate of revolution; as such, protecting the tool and providing accurate cuts in the work piece.

As will be seen from the detailed description that follows, the invention provides a rigid tapping feedback assembly that may be retrofit on a conventional milling machine to provide feedback to the computing device and assist in controlling the feed rate of the automated drive. Additional features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

In the accompanying drawings which form a part of the specification and which are to be read in conjunction therewith, and in which like reference numerals are used to indicate like parts in the various views.

DETAILED DESCRIPTION OF THE INVENTION

Figure 1:
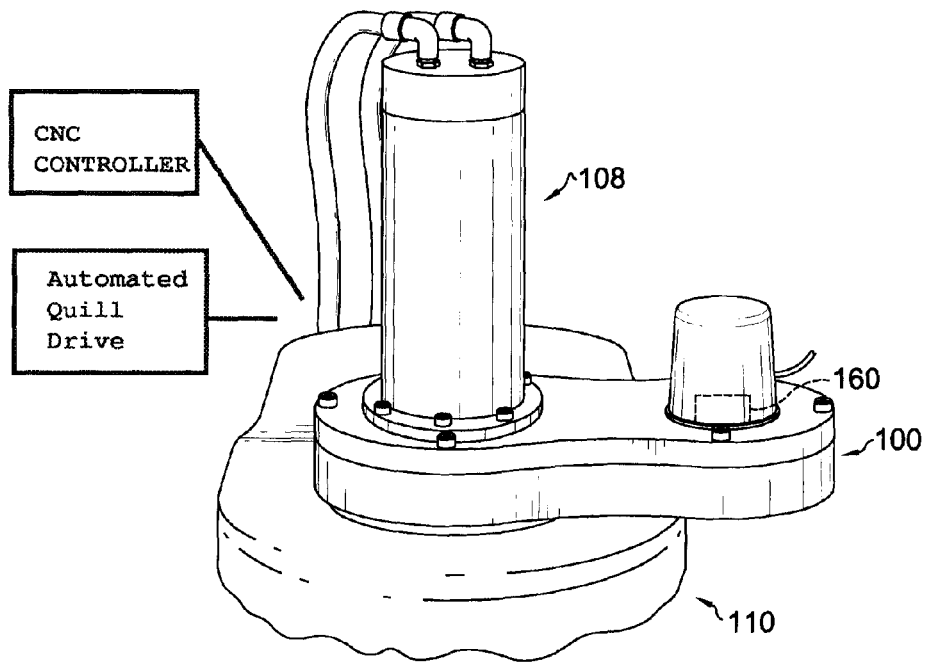
FIG. 1 is a diagrammatic exterior perspective view of a rigid tapping feedback assembly, positioned according to an embodiment of the present invention with an internal rotary encoder visible.

Referring to the drawings in greater detail and initially to FIG. 1, a rigid tapping feedback assembly is shown and designated generally by reference numeral 100. Generally, the rigid tapping feedback assembly 100 is mounted to conventional milling machine 110. Although used herein, "conventional milling machine" is not meant to be limiting and may comprise any form of milling machine (e.g., horizontal, vertical, Bridgeport, knee-type mill, turret mill, bed-type mill, etc.) or machining apparatus that achieves cutting by rotating a spindle having a tool attached thereto. As shown, a power drawbar 108 is mounted on the opposed side of the rigid tapping feedback assembly; however, it will be understood and appreciated by those of ordinary skill in the art that utilizing the power drawbar 108 in conjunction with the conventional milling machine 110 is considered an optional feature. A rotary encoder 160 is also depicted, enclosed in a protective cover, and is discussed more fully below with reference to FIG. 7.

Figure 2:
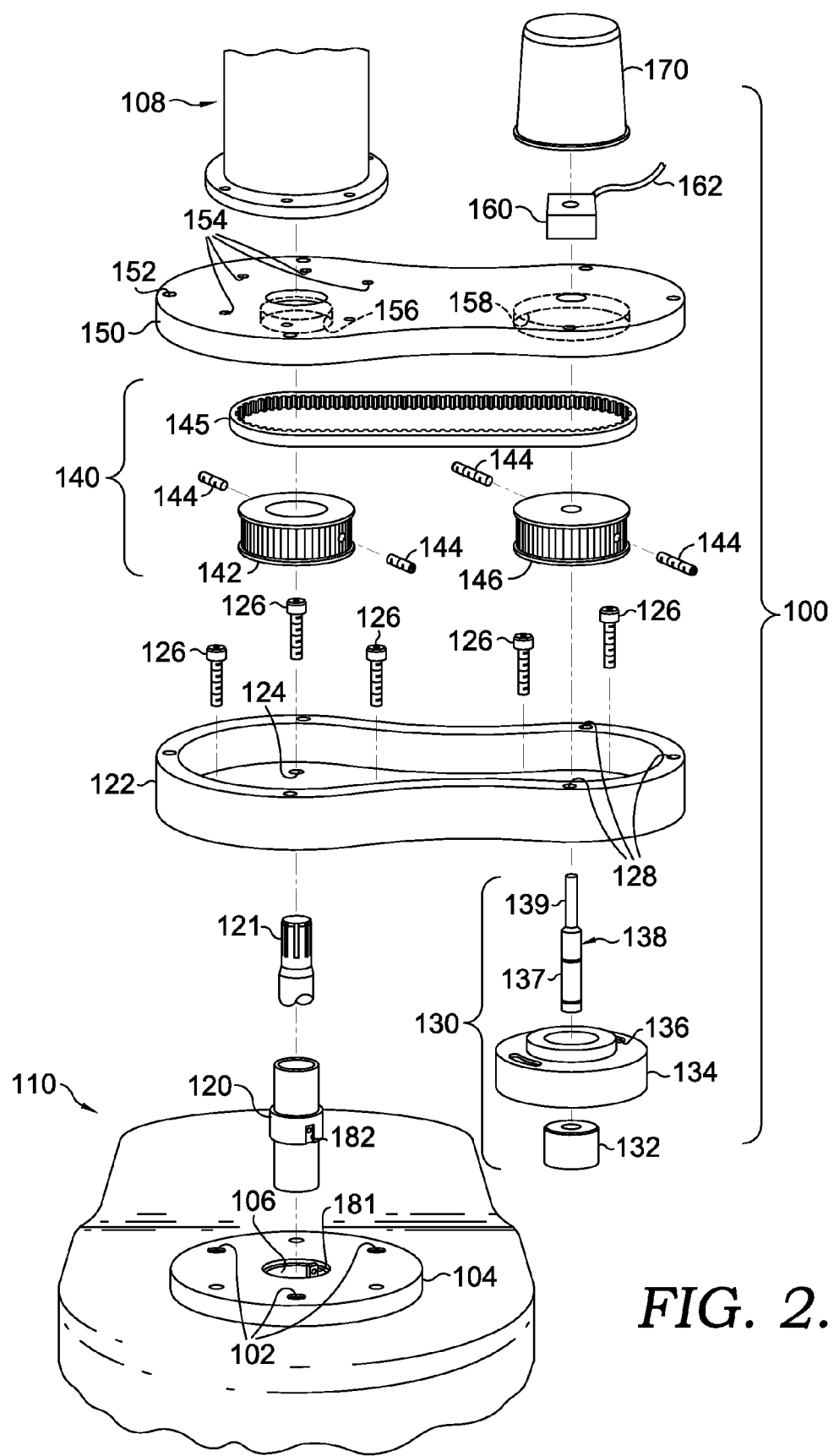
FIG. 2 is an exploded view of the rigid tapping feedback assembly with a fragmentary front side elevation view of a conventional milling machine, in accordance with an embodiment of the present invention.

Turning now to FIG. 2, an exploded view of the rigid tapping feedback assembly 100 is shown. The rigid tapping feedback assembly 100 includes a housing 122, spindle-pulley adapter 120, a shaft assembly 130, a pulley assembly 140, a housing cover plate 150, a rotary encoder 160, and a protective cover 170.

Figure 3:
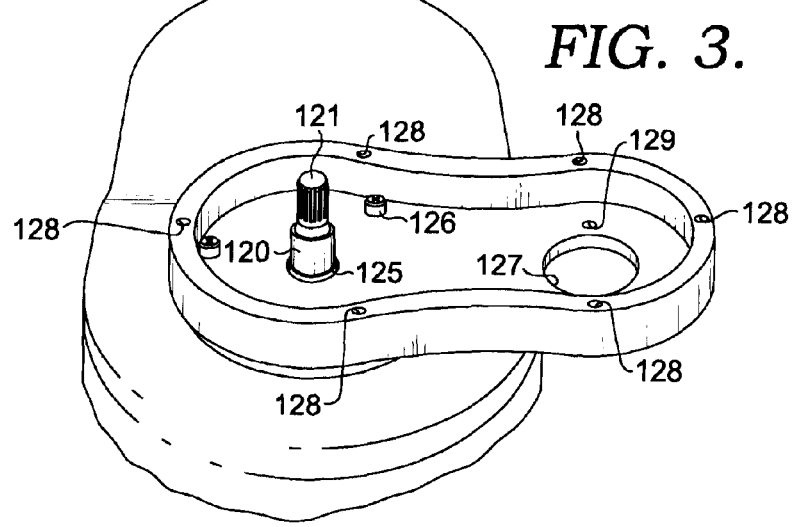
FIG. 3 is an interior perspective view of a housing mounted to a conventional milling machine and spindle-pulley adapter mounted to a spindle, in accordance with an embodiment of the present invention.

Typically, the rigid tapping feedback assembly 100 is mounted, or retrofit, onto a conventional milling machine 110 by fixedly attaching the housing 122 thereto. The housing 122 may be formed of sturdy material, such as machined steel or aluminum. It should be understood that any other suitable materials could also be used, e.g., stamped or cast metal, plastic, synthetic material, etc. The housing 122 includes a bottom wall having mounting apertures 124 for receiving mounting screws 126, and upstanding side walls having mounting holes 128, the side walls are configured to protect components of the rigid tapping feedback assembly 100 from machining debris and chips. Mounting apertures 124, as well as other mounting holes and apertures discussed below, may be formed by cutting, stamping, or any other suitable fabrication process. In one embodiment, the mounting apertures 124 may be positioned according to the footprint of the lift holes 102 and aligned therewith. In this exemplary embodiment, the conventional milling machine 110 includes lift holes 102 tapped into the bearing cap 104 for disassembling the power drawbar 108 from its original mounting position on a bearing cap 104. As such, the mounting screws 126, typically three, may be inserted through the mounting apertures 124 and may be threadably engaged to the bearing cap 104 bringing the bottom wall against an external surface of the bearing cap 104. In another embodiment, typically where lift holes 102 are not provided, the housing 122 may be fixedly attached to the conventional milling machine 110 by drilling and tapping holes into the bearing cap 104 and assembling mounting hardware 126 thereto. A depiction of the housing 122 assembled to the bearing cap 104 with mounting screws 126 is illustrated in FIG. 3. Although, utilizing mounting screws 126 is discussed above, the present invention considers any suitable hardware or mounting techniques (e.g., welding, tacking, riveting, etc.) for fixedly attaching the housing 122 to the conventional milling machine 110.

Returning to FIG. 2, the spindle-pulley adapter 120 is illustrated. Spindle-pulley adapter 120 includes a keyway slot 182 and may circumferentially engage a drawbar shaft 121 assembled to the spindle. In this embodiment, the drawbar shaft 121 may transmit torque by interconnecting the power drawbar 108 to the spindle. In another embodiment, the drawbar shaft 121 is machined with a spline to mate with an internal gear of a manual drawbar. Further, there may be no drawbar shaft assembled to the spline or circumferentially engaged to the spindle-pulley adapter 120 in the instance that no externally mounted drawbar is provided. The keyway slot 182 is typically machined to mate with, and receive, a square key 181 installed on the spindle end 106. That is, the keyway slot 182 captures the square key 181 such that the spindle-pulley adapter 120 is drivably engaged in substantial axial alignment with the spindle. In one embodiment, the keyway slot 182 is a machined depression on an outer radial periphery of the spindle-pulley adapter 120. In another embodiment, the keyway slot 182 may be a machined groove, cut, aperture, etc., to capture a spring pin employed as the square key 181. Although two different configurations of the drivable engagement of the spindle-pulley adapter 120 and the spindle end 106 have been shown, it should be understood and appreciated by those of ordinary skill in the art that other engagement mechanisms could be used, and that the invention is not limited to those engagement mechanisms shown and described. Additionally, as demonstrated in FIG. 3, the housing 122 is formed with an aperture 125 such that the spindle-pulley adapter 120 may extend therethrough.

Returning to FIG. 2, the shaft assembly 130 is illustrated in an exploded view. Shaft assembly 130 includes an encoder shaft 138, a shaft adapter 134 having arcuate slots 136, and a bearing 132. Encoder shaft 138 is typically press-fit into an internal radial surface of the bearing 132 (e.g., inner race). In one embodiment, the bearing 132 is a rigid double-row radial bearing that lends axial support to the encoder shaft 138. Bearing 132 is typically retained within an inner radial surface of the shaft adapter 134. In one embodiment, the shaft adapter 134 is provided with grooves within the inner radial surface (not shown) that holds snap-rings for retaining the bearing 132. Typically, the bearing 132 is retained such that an external radial surface (e.g., outer race) is fixedly engaged to the inner radial surface of the shaft adapter 134. In this configuration, the inner race of the bearing 132 is able to rotate independently of the shaft adapter 134. That is, the bearing 132 rotatably couples the encoder shaft 138 to the shaft adapter 134.

Figure 4:
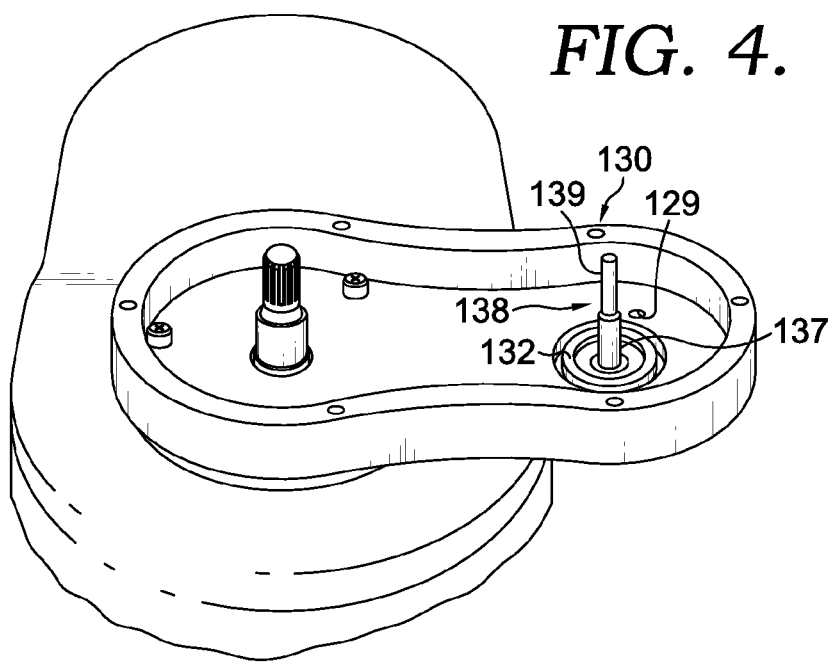
FIG. 4 is a view similar to FIG. 3, but with a shaft assembly assembled thereto, in accordance with an embodiment of the present invention.

As shown in FIG. 4, the shaft assembly 130 is mounted to the housing 122. In one embodiment, the shaft assembly 130 is mounted such that the arcuate slots 136 of the shaft adapter 134 (hidden in this view) are aligned with mounting apertures 129 of the housing 122. This alignment is configured to accept mounting hardware (e.g., mounting screws 126) to fasten the shaft assembly 130 to the housing 122 in fixed attachment. In another embodiment, prior to fastening in fixed attachment, but subsequent to inserting mounting hardware through the mounting apertures 129 and arcuate slots 136, the shaft assembly may be adjusted laterally to introduce or remove tension from a timing belt 145 (more fully discussed below). Upon fixedly attaching the shaft assembly 130 to the housing 122, the encoder shaft 138 is allowed to freely rotate independently of the housing 122. Further, the encoder shaft 138 includes an upper portion 139 and a lower portion 137. As more fully discussed below, the upper portion 139 is adapted to mate with the rotary encoder 160, and the lower portion 137 is adapted to circumferentially engage with a timing pulley 146.

Figure 5:
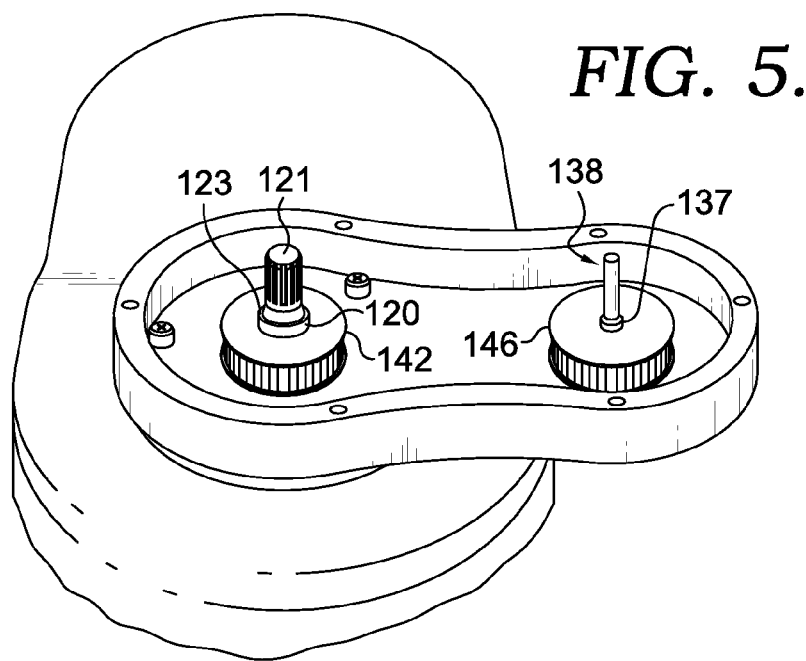
FIG. 5 is view similar to FIG. 4, but with a drive pulley and a timing pulley assembled thereto, in accordance with an embodiment of the present invention.

Returning again to FIG. 2, the pulley assembly 140 is illustrated and will now be discussed. Pulley assembly 140 includes a drive pulley 142, a timing pulley 146, and a timing belt 145. Typically, drive pulley 142 includes a centrally-disposed bore that is in circumferential engagement with the spindle-pulley adapter 120 (FIG. 5). That is, in this embodiment, the drive pulley 142 is substantially axially aligned with the spindle-pulley adapter 120, and accordingly, substantially axially aligned with the spindle. In one instance, the circumferential engagement is a press-fit such that frictional resistance couples the drive pulley 142 to the spindle-pulley adapter 120. In another instance, the circumferential engagement allows the centrally-disposed bore of the drive pulley 142 to slidably assemble to the spindle-pulley adapter 120. In this instance, set screws 144 may be inserted within lateral threaded holes in the drive pulley 142 to secure the drive pulley 142 to the spindle-pulley adapter 120.

The timing pulley 146, similar to the drive pulley 142, includes a centrally-disposed bore that is concentric to the circumference of the timing pulley 146. The centrally-disposed bore is in circumferential engagement with the lower portion 137 of the encoder shaft 138 (FIG. 5). Also similar to the drive pulley 142, circumferential engagement of the timing pulley 146 to the encoder shaft 138 may be press-fit, secured by set screws 144, or by any other suitable fastening method known or used in the fabrication industry.

Referring now to FIG. 5, the pulleys 142, 146 are shown as assembled to the spindle-pulley adapter 120 and encoder shaft 138 respectively. In this embodiment, the pulleys 142, 146 are depicted as having a generally circular configuration. It should be understood and appreciated by those of ordinary skill in the art that other configurations could be used, and that the invention is not limited to the circular shape shown and described. Further, the centrally-disposed bores are depicted as having a generally circular configuration; however, it should be understood and appreciated by those of ordinary skill in the art that other configurations—along with the fabrication operations required to achieve those configurations—could be used, and that the invention is not limited to the bored circular shape shown and described. Further, the pulleys 142, 146 may include teeth that mate with matching teeth on the timing belt 145, more fully discussed below with reference to FIG. 6. In other embodiments, circumferential surfaces of the pulleys 142, 146, may flat, grooved, or fabricated in any manner such that a belt looped between the pulleys will generally mechanically link them together.

Figure 6:
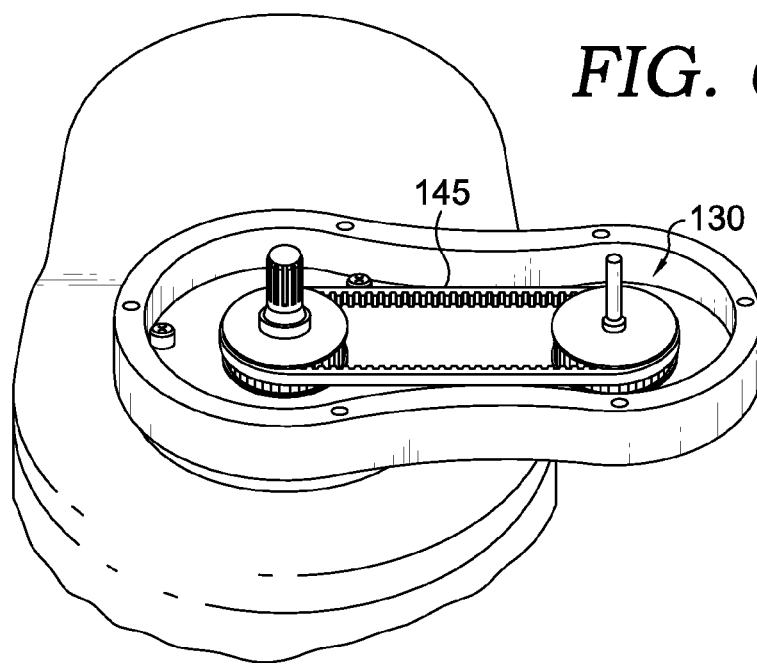
FIG. 6 is a view similar to FIG. 5, but with a timing belt assembled thereto, in accordance with an embodiment of the present invention.

Turning now to FIG. 6, a timing belt 145 is depicted assembled in conjunction with the pulleys 142, 146. Timing belt 145 drives the pulleys 142, 146, concurrently so that rotation is transmitted from the drive pulley 142 to the timing pulley 146. In one embodiment, the timing belt 145 is a positive transfer belt that includes teeth for mating with matching teeth on circumferential surfaces of the pulleys 142, 146. In this embodiment, slippage is significantly reduced to allow for tracking of relative movement between the pulleys 142, 146. By way of example only and not limitation, the circumferences of the pulleys 142, 146, may have a one-to-one ratio. When mechanically linked by the timing pulley 145 having teeth, the angular rotation of the drive pulley 142 is substantially transmitted to the timing pulley 146 so that the rate of revolution of the spindle is accurately reflected by the rotation of the encoder shaft 138. In other embodiments, the timing belt 145 may connect pulleys 142, 146, with other circumferential ratios. Further, it should be understood that the designation of reference numeral 140 as "pulley assembly" is not meant to be limiting, wherein the pulley assembly may be formed of a gears, hydraulics, or any other suitable mechanical linkage between two or more rotating components known to those of ordinary skill in the fabrication industry.

Figure 7:
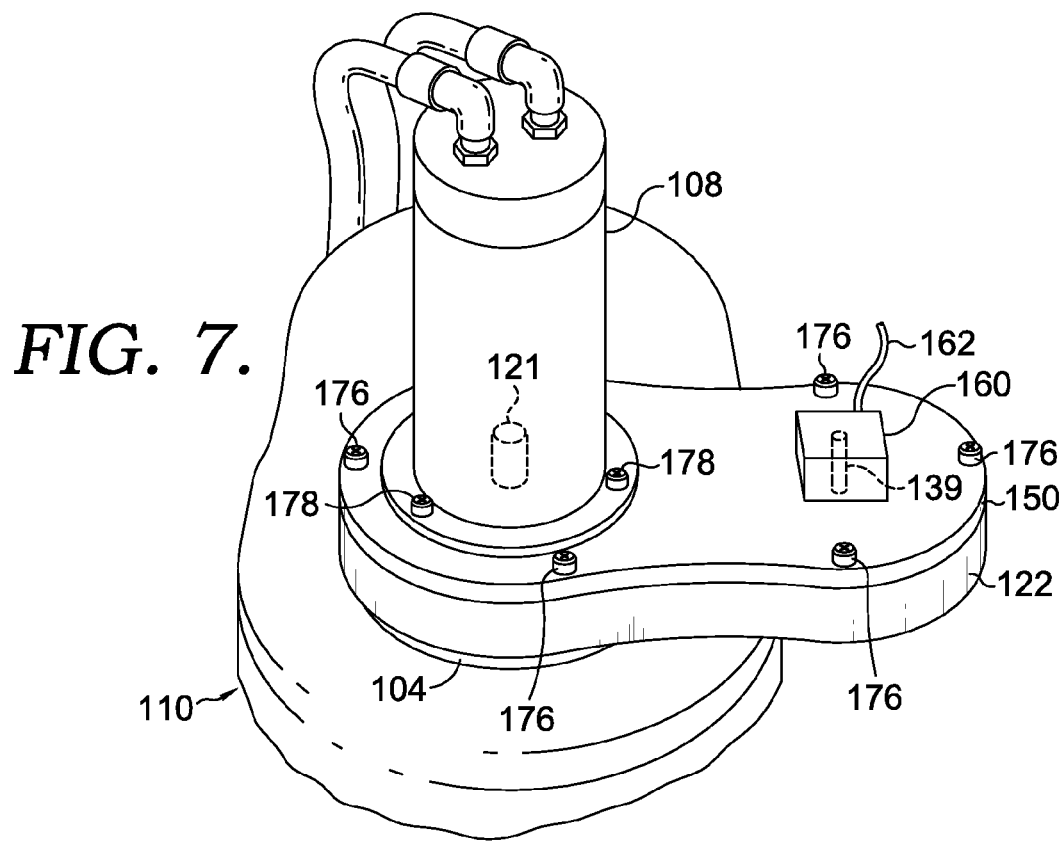
FIG. 7 is a view similar to FIG. 6, but with a housing cover supporting a rotary encoder and power drawbar assembled thereto, in accordance with embodiments of the present invention.

Returning to FIG. 2, the housing cover plate 150 will now be discussed. Housing cover plate 150 may be formed of sturdy material, such as machined steel, aluminum, or any other suitable materials. In one embodiment, the housing cover plate 150 is adapted to mount to the upstanding side walls of the housing 122 and is shaped in a profile corresponding therewith. Housing cover plate 150 includes assembly apertures 152, mounting holes 154, a spline hole 156, and a shaft hole 158. Assembly apertures 152 are positioned to be in alignment with mounting holes 128 of the housing 122 so that fasteners 176 (FIG. 7) may be received therein. Typically, the assembly apertures 152 are spaced such that they are located along a perimeter of housing cover plate 150. As depicted in FIG. 7, the housing cover plate 150 is assembled to the housing 122 such that the spindle-pulley adapter 120, the pulley assembly 140, and the encoder shaft 138 are partially enclosed to protect the moving components from external contaminants, machine chips, and other debris.

Referring now to FIG. 2, the mounting holes 154 are arranged to align with a mounting hole footprint of the power drawbar 108. In one embodiment, the mounting hole footprint is similar to the layout of the mounting apertures 124 on the housing 122. Mounting holes 154 may receive fasteners 178 (FIG. 7) to fixedly attached the power drawbar 108 to the housing cover plate 150. As shown in FIG. 7, the housing 122 and housing cover 150, as retrofit to the conventional milling machine 110, provide a vertical spacer between the power drawbar 108 and the bearing cap 104.

Returning to FIG. 2, the spline hole 156 and the shaft hole 158 are through-holes within the housing cover plate 150. These holes 156, 158, may be formed by cutting, stamping, or any other suitable fabrication process. In one embodiment, the holes 156, 158, may include counter-bores to provide clearance for rotating components of the rigid tapping feedback assembly 100 (e.g., pulleys 142, 146, or spindle-pulley adapter 120). Spline hole 156 is typically in substantial axial alignment with the spindle end 106 of the spindle. Further, the drawbar shaft 121, which is drivably engaged to the spindle end 106, may extend through the spline hole 156 and engage the power drawbar 108. That is, provided that the optional power drawbar is available, the drawbar shaft 121 interconnects the spindle and the power drawbar 108 in substantial axial alignment. Shaft hole 158 is typically in substantial axial alignment with the encoder shaft 138 of the shaft assembly 130. Further, the upper portion 139 of the encoder shaft 138 may be adapted to extend through the shaft hole 158 and engage the rotary encoder 160. In one embodiment, engagement may be made by machining a keyed surface on the upper portion 139 that mates to the rotary encoder 160 thereby establishing an accurate transfer of rotational movement between the pulleys 142, 146, and the rotary sensor 160.

As shown in FIG. 7, the rotary sensor 160 is supported by an external surface of the housing cover plate 150. Attachment may be made by fasteners (not shown) such as hex-bolts, hex-nuts, or any other suitable fasteners which are well known in the fabrication industry. Although a single configuration of the attachment has been shown, it should be understood and appreciated by those of ordinary skill in the art that other methods of attachment could be used, and that the invention is not limited to the configuration shown and described. By way of example and not limitation, the rotary encoder 160 may be mounted about the spindle end 106 and configured as a sensing ring thereby directly determining the rate of revolution of the spindle.

As discussed above, the rotary encoder 160 is in substantial axial alignment with the encoder shaft 138, which is in indirect rotational communication with the spindle. During a machining operation, when the milling machine motor is driving the spindle rotationally, the rotary encoder 160 is adapted to sense the rate of revolution of the spindle. Typically, rotary encoder 160 includes a wire 162, or pigtail, extending therefrom for communicating the rate of revolution to a controller (not shown). As used herein, the term "rotary encoder" is not meant to be limiting and may comprise any form of sensor that can convert angular position of a shaft to an analog or digital code (e.g., motion sensor, optical sensor, electro-mechanical device, etc.). That is, any method of sensing a rate of revolution and providing an output code that is known in the art is also contemplated by the present invention. This code may be read by a computing device, such as a microprocessor, to determine the angle of the shaft. In one embodiment, the computing device is a CNC controller having an input that accepts and analyzes communications from the rotary encoder 160. Persons familiar with the field of the invention will realize that the computing device may be practiced by various devices which are different from the specific exemplary embodiments above and may be operatively interconnected between one or more sensors/encoders and drive component(s); accordingly, it is emphasized that the invention is not limited only to the embodiments depicted. In one instance, the drive component(s) may comprise an automated drive (e.g., automated quill drive assembly) that can retract and extend the spindle in the Z-axis of the conventional milling machine 110.

Returning to FIG. 2, the protective cover 170 is depicted. Protective cover 170 may be form of molded plastic or any other suitable material, and may be coupled to the housing cover plate 150 by adhesion, snap-fit, or other methods of coupling understood by those of ordinary skill in the art. In one embodiment, the protective cover 170 is attached externally to the housing cover plate 150 such that the protective cover 170 generally encloses the rotary encoder 160. In this embodiment, the protective cover 170 provides a barrier between the rotary encoder 160 and the machining environment.

The operation of the rigid tapping feedback assembly 100, as retrofitted upon the conventional milling machine 110, is best described with reference to FIG. 2. Initially, the milling machine motor rotates the spindle at a certain rate of revolution. This rate of revolution may vary based on the milling machine motor setting, the type of work piece being cut, the feed rate of downward movement, or spindle extension in the Z-axis into the work piece, and the like. The spindle-pulley adapter 120, which is drivably engaged to the spindle end 106 of the spindle, is also rotated at the rate of revolution. In one embodiment, the rotary encoder 160 is a sensor ring that reads the rate of revolution from the spindle-pulley adapter 120 and/or spindle end 106 directly.

Typically, the spindle-pulley adapter 120 and the encoder shaft 138 are held in substantial parallel-spaced relation by the housing 122. The rate of revolution of the spindle may be transmitted from the spindle-pulley adapter 120 to the encoder shaft 138 by the pulley assembly 140. In an exemplary embodiment, the circumferences of the drive pulley 142 and the timing pulley 146 are similar so that rate of revolution is transmitted from the spindle-pulley adapter 120 to the encoder shaft 138 in a one-to-one ratio. Although one embodiment is depicted and discussed above, it will be understood and appreciated by those of ordinary skill in the art that other circumferential ratios of the pulleys 142, 146, or gears, exist, and other various techniques for transmitting the rate of revolution between the spindle and the encoder shaft 160 are available. These configurations are also contemplated by the present invention.

In the exemplary embodiment depicted in FIG. 2, the encoder shaft 138 includes an upper portion 139 that protrudes through the housing cover plate 150 and engages the rotary encoder 160 in substantial axial alignment. As more fully discussed above, engagement may be made by a machined keyed surface on the upper portion 139, or any other mating arrangement that may establish an accurate transfer of rotational movement between the encoder shaft 138 and the rotary encoder 160. The rotary encoder 160, which is typically supported by the housing cover plate 150, continuously monitors the rate of revolution of the encoder shaft 138 and provides an output signal to the computing device where the signal is indicative of the rate of revolution. In one embodiment, the rotary encoder 160 communicates with the computing device by a wire 162, or pigtail, that feeds into an input on the computing device. The above-illustrated technique of communication is an exemplary configuration only; accordingly, any suitable signal indicative of the rate of revolution from the rotary encoder 160 and any operative connection between the computing device and rotary encoder 160 known in the fabrication industry may be used and is considered by the present invention.

Typically, the computing device is operatively connected to the automated drive. As such, the computing device is able to assist in controlling the retraction or extension of the spindle in the Z-axis. Incident to receiving the indication of the rate of revolution, the computing device may adjust the feed rate of downward/upward movement, or spindle extension/retraction in the Z-axis, into the work piece. The advantage is that the rotary encoder 160 provides the computing device with feedback indicating the actual rate of revolution of the spindle. The actual rate of revolution may rectify any deviations from the initial rotation speed set at the milling machine motor.

For instance, the spindle may rotate at a rate of revolution as determined by the setting of the milling machine motor (e.g., 100 RPM). But, if the spindle begins to rotate at a rate of revolution other than the set rotational speed, and the rotary encoder 160 is not available to provide feedback, the predetermined feed rate of the spindle is unaffected by this change in the rate of revolution. Typically, the predetermined feed rate is based upon the Q-parameter, or pitch, of the tap of the tool that is attached to the spindle (e.g., ¹/₂₀ or 0.05 inches downward in the Z-axis per rotation). Without feedback, the computing device will cause the spindle to drive the tool downward at a feed rate that does not correspond efficient machining practices (e.g., a feed rate inconsistent with 5 inches per minute). This may result in creating undue stress on the tool and/or uncontrolled cutting on the work piece.

Conversely, as embodied in the present invention, the predetermined feed rate of the spindle may be affected by the indication of the actual rate of revolution communicated by the rotary sensor 160. In this instance, the computing device will process the input from the rotary sensor 160 and adjust the feed rate of the spindle in accordance therewith. This may result in varying the feed rate so that it corresponds with the unpredicted variations in the spindle rate of revolution; as such, protecting the tool and providing accurate cuts in the work piece.

It should be understood that the construction of the rigid tapping feedback assembly 100 lends itself to be easily assembled (e.g., retrofitted) and disassembled from the conventional milling machine 100 (e.g., Bridgeport Machine). Specifically the nature of the mounting apertures 124 in the housing 122 that align with the lift holes 102 in the bearing cap 104 to allow for the rigid tapping assembly 100 to be easily installed or removed as a unit and individually shipped. While much of the discussion above focused on a specific embodiment of the conventional milling machine 110, the invention is applicable to any mechanical apparatus having a mechanism that rotates a spindle for the machining or cutting a work piece.

The present invention has been described in relation to particular embodiments, which are intended in all respects to be illustrative rather than restrictive. Alternative embodiments will become apparent to those skilled in the art to which the present invention pertains without departing from its scope.

It will be seen from the foregoing that this invention is one well adapted to attain the ends and objects set forth above, and to attain other advantages, which are obvious and inherent in the device. It will be understood that certain features and subcombinations are of utility and may be employed without reference to other features and subcombinations. This is contemplated by and within the scope of the claims. It will be appreciated by persons skilled in the art that the present invention is not limited to what has been particularly shown and described hereinabove. Rather, all matter herein set forth or shown in the accompanying drawings is to be interpreted as illustrative and not limiting.

What is claimed is:

1. A rigid tapping feedback assembly for a milling machine having a spindle with a spindle end machined on one end and opposed end configured to attach a tool, a computing device operably connected to an automated drive that translates the spindle, and a milling machine motor that rotates the spindle at a rate of revolution, the rigid tapping feedback assembly comprising:
   a spindle-pulley adapter that is drivably engaged to the spindle end;
   a housing that is fixedly attached to the milling machine, wherein the housing is fixedly attached to a bearing cap of the milling machine, the bearing cap configured with an aperture to receive the spindle end extending therethrough;
   a sensor shaft that is rotatably coupled to the housing, the housing supporting the sensor shaft in substantial parallel-spaced relation to the spindle-pulley adapter;
   a pulley assembly that mechanically links the spindle-pulley adapter and the sensor shaft, wherein the rate of revolution of the spindle is generally proportional to resultant angular rotation of the sensor shaft; and
   a sensor configured to monitor the resultant angular rotation of the sensor shaft, wherein the sensor communicates an indication of the resultant angular rotation to the computing device; and
   a housing cover plate fixedly attached to the housing, where the attached housing cover plate and housing substantially encompass the pulley assembly, and wherein the housing cover plate includes a mounting footprint, the mounting footprint is adapted to receive fasteners for attaching a drawbar to the housing cover plate, wherein the spindle-pulley adapter, which is drivably engaged to the spindle end, is interconnected between the spindle and the draw bar.

2. The rigid tapping feedback assembly of claim 1, wherein the housing cover plate supports the sensor in substantial alignment with the sensor shaft.

3. The rigid tapping feedback assembly of claim 1, wherein the sensor is a rotary encoder, the rotary encoder is engaged with the sensor shaft.

4. The rigid tapping feedback assembly of claim 3, wherein, incident to the rotary encoder communicating an indication of the resultant angular rotation of the sensor shaft, the computing device is configured to determine a rate of revolution based upon the indication of the resultant angular rotation of the sensor shaft.

5. The rigid tapping feedback assembly of claim 4, wherein, incident to the rotary encoder communicating the indication of the angular rotation of the sensor shaft, the computing device compares the rate of revolution determined by the computing device against the rate of revolution provided by the milling machine motor and directs the automated drive to adjust the translation of the spindle.

6. The rigid tapping feedback assembly of claim 1, wherein the pulley assembly that mechanically links the spindle-pulley adapter and the sensor shaft is comprised of:
   a first pulley circumferentially engaged to the spindle-pulley adapter;
   a second pulley circumferentially engaged to the sensor shaft; and
   a belt coupling the first pulley and second pulley such that the spindle-pulley adapter and sensor shaft rotate concurrently.

7. The rigid tapping feedback assembly of claim 6, wherein the belt is a timing belt having teeth, wherein the pulleys each include outer radial surfaces having teeth that engaged with the teeth of the timing belt.

8. A milling machine, comprising:
   a spindle with a spindle end machined on one end and configured to attach a tool to opposed end, wherein the spindle is configured to rotate at a rate of revolution;
   an automated quill drive that translates the spindle at an extension rate;
   a CNC controller that is operably connected to the automated quill drive; wherein the CNC controller is configured to control the extension rate of the automated quill drive;
   a milling machine motor that rotates the spindle at an initial rotational speed;
   a spindle-pulley adapter that is drivably engaged to the spindle end;
   a housing;
   an encoder shaft that is rotatably coupled to the housing, the housing supporting the encoder shaft in substantial parallel-spaced relation to the spindle-pulley adapter;
   a pulley assembly that comprises a drive pulley circumferentially engaged to the spindle-pulley adapter, a timing pulley circumferentially engaged to the encoder shaft, and a belt that mechanically links the drive pulley and the timing pulley, wherein the rate of revolution is of the spindle-pulley adapter is tracked by angular rotation of the encoder shaft;
   a rotary encoder that utilizes the encoder shaft to sense the angular rotation of the encoder shaft;
   a cover plate fixedly attached to the housing to a create a protective body, the protective body substantially encompassing the pulley assembly; and
   a drawbar mounted to the cover plate, the cover plate having an aperture for receiving a portion of the spindle-pulley adapter, the portion of the spindle-pulley adapter drivably engaged with the drawbar.

9. The milling machine of claim 8, further comprising a bearing that rotatably couples the encoder shaft to the housing.

10. The milling machine of claim 9, further comprising a shaft adapter having slots configured to receive fasteners, the shaft adapter is circumferentially engaged to the bearing and adjustably mounted to the housing with the fasteners, wherein lateral movement of the shaft adapter independent of the housing introduces or removes tension from the belt.

11. The milling machine of claim 8, wherein the drive pulley and the timing pulley include outer radial surfaces having notches, wherein the belt is a timing belt having notches that engage with the notches on the outer radial surfaces.

12. The milling machine of claim 11, wherein the circumference of the outer radial surfaces of the drive pulley and the timing pulley are similar such that the rate of revolution of the spindle-pulley adapter and the angular rotation of the spindle-pulley adapter differ by less than one rotation per minute.

13. The milling machine of claim 8, wherein the rotary encoder provides an output signal indicative of the angular rotation to the CNC controller, the CNC controller is configured to receive the output signal from the rotary encoder and determine the rate of revolution therefrom.

14. A milling machine, comprising:
   a spindle with a spindle end machined on one end and configured to attach a tool to the opposed end, wherein the spindle is configured to rotate at a rate of revolution;
   an automated quill drive that translates the spindle at an extension rate;
   a CNC controller that is operably connected to the automated quill drive; wherein the CNC controller is configured to control the extension rate of the automated quill drive;
   a milling machine motor that rotates the spindle at an initial rotational speed;
   a spindle-pulley adapter that is drivably engaged to the spindle end;
   a housing;
   an encoder shaft that is rotatably coupled to the housing, the housing supporting the encoder shaft in substantial parallel-spaced relation to the spindle-pulley adapter;
   a pulley assembly that comprises a drive pulley circumferentially engaged to the spindle-pulley adapter, a timing pulley circumferentially engaged to the encoder shaft, and a belt that mechanically links the drive pulley and encoder pulley, wherein the rate of revolution of the spindle-pulley adapter is tracked by angular rotation of the encoder shaft, wherein the drive pulley and the timing pulley include outer radial surfaces that engage with the belt, and wherein the size of the drive pulley and the timing pulley are similar such that the rate of revolution of the spindle-pulley adapter and the angular rotation of the encoder shaft differ by less than one rotation per minute; and
   a rotary encoder that utilizes the encoder shaft to sense the angular rotation of the encoder shaft.

\* \* \* \* \*